May 3, 1932. C. F. JENKINS Re. 18,452

SPIRAL MOUNTED LENS DISK

Original Filed Jan. 2, 1925

C. Francis Jenkins
INVENTOR

BY Darby & Darby
ATTORNEYS.

Reissued May 3, 1932 Re. 18,452

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

SPIRAL MOUNTED LENS DISK

Original No. 1,679,086, dated July 31, 1928, Serial No. 222, filed January 2, 1925. Application for reissue filed June 24, 1930. Serial No. 463,555.

This invention relates to apparatus for the transmission of pictures by radio, in which the picture is made up of lines across an approximately flat surface, said lines having varying values.

The principal object of this invention is the design of a simple device which permits of a speed which will cover the entire picture surface within the time of persistence of vision, say, one-twelfth or one-sixteenth of a second.

With these and other objects in view the invention consists of the novel details of construction and combination of parts more fully hereinafter disclosed and particularly pointed out in the claims.

Figure 1:
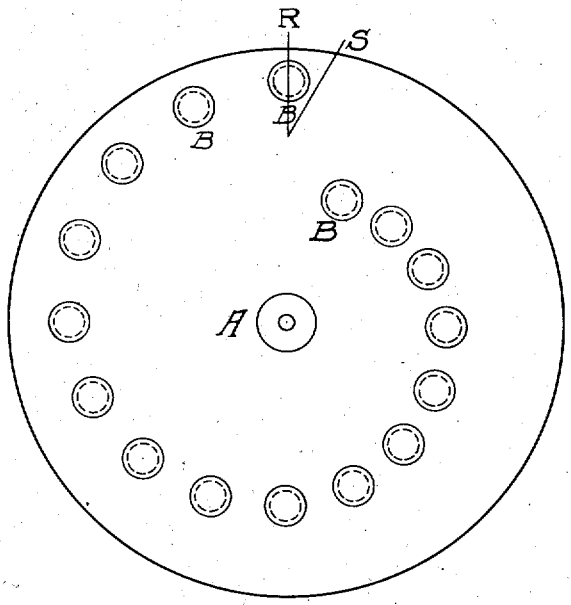
Figure 2:
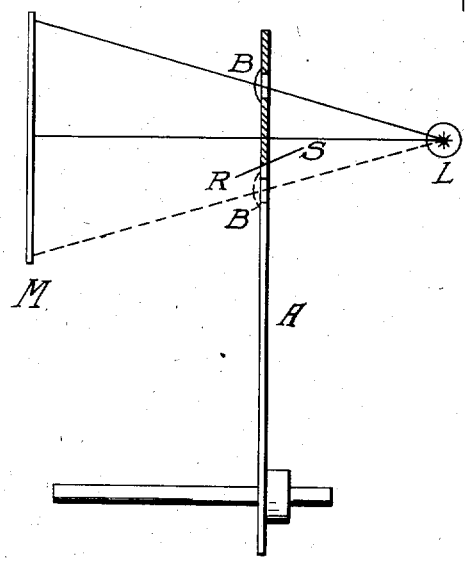

Referring to the accompanying drawings forming a part of this specification, Figure 1 is a front view of the lens-carrier disk, and Figure 2 a schematic drawing showing how it is employed.

In the drawings A is a disk with a plurality of spirally arranged holes therein, over each of which a lens is mounted, as B, B′, B″, etc. The disk is intended to be rotated between a spot-source of light L, and a picture surface or screen M, shown edge on.

When the lens B is in front of the light the image of the source strikes the screen near the top, as shown in full line; when the lens B″ is in position to project, the image will appear on the picture surface near the bottom, as indicated by the dotted line; when other lenses come into position to project, the images fall in successively different positions between these extremes.

It will readily be understood that the rotation of the disk would cause the lenses to travel across the screen from side to side; while the location of the lenses at different radial distances from the axis makes the lateral trips of each lens at different levels, so that the whole picture surface is scanned.

It will also be understood that the disk-mounted lenses could just as well scan a picture surface to be sent as they scan a screen upon which the picture is put, without departing from the spirit of my invention.

What I claim is—

1. In combination, a stationary picture surface, a stationary light translating element, a rotatable disk interposed between said surface and said element, said disk being provided with a plurality of apertures of large dimensions as compared with an elementary area of the picture surface, and a spherical lens mounted in each aperture for imaging the picture surface and the light translating element each upon the other, said apertures and lenses being so arranged that upon rotation of the disk the lenses pass successively between said surface and said element, and successive images of the light translating element traverse the picture surface by adjacent parallel paths.

2. In combination, a stationary light translating element, and a scanning device consisting of a rotatable disk interposed between the said element and a plane to be scanned, said disk being provided with a plurality of apertures of large dimensions as compared with an elementary area of the scanned plane, and a lens mounted in each aperture, said apertures and lenses being so arranged that upon rotation of the disk the lenses will pass between said plane and said element and successive images of the light translating element traverse the plane by adjacent parallel paths.

3. Means for electro-optically reproducing an image in successive light spots of elemental area comprising means for producing a spot source of light, a rotatable scanner having a plurality of apertures for subdividing said beam into smaller beams having a cross section many times greater than that of an elemental light spot required for proper reproduction of the image at the plane of subdivision, and means associated with each aperture for separately collecting the light from each of said subdivided beams and imaging the spot source upon a picture receiving surface.

4. In an image producing system the combination of a spot source of light, a picture screen, a rotating disk, and means including a plurality of light collecting and imaging devices spirally mounted on said disk for collecting light from said spot source and imaging it directly upon said picture screen.

5. In a system for reproducing images in successive elemental light spots, the combination of a spot source of light, a picture screen, a rotating disk having apertures large as compared with said elemental light spots arranged in spiral sequence on said disk, a lens for each of said apertures rotatable with said disk for collecting the light from said spot source and projecting it directly upon said screen.

6. The method of projecting enlarged images on a picture screen which comprises producing a spot source of light, separately collecting and imaging the light directly from said source in an elemental spot upon the screen, and moving the elemental spot over the surface of the screen to reproduce the image by projection on said screen.

7. In a television reproducing system, the combination of a spot light source, a spiral lens disk and a screen upon which said spot light source is directly imaged by the lenses in said disk.

8. In a television system, the combination in optical sequence of a spot light source; a rotatable disk upon which the light from said spot is projected directly, a plurality of lenses carried by said disk; and a screen upon which the spot light source is imaged directly by said lenses.

9. The method of televisually projecting an image on a screen which comprises producing a spot source of light, rotating as a unit a plurality of separate light collecting and imaging devices in succession past said source to image said source upon the reproducing screen, whereby said image may be projected in enlarged dimensions on said screen.

In testimony whereof I have hereunto set my hand on this 28th day of May, 1930.

CHARLES FRANCIS JENKINS.